(12) United States Patent
Kim et al.

(10) Patent No.: US 8,776,937 B2
(45) Date of Patent: Jul. 15, 2014

(54) FRONT DIFFERENTIAL-INTEGRATED ENGINE SUPPORT BRACKET

(75) Inventors: Seung Won Kim, Seoul (KR); Kong Sup Jung, Hwaseong-si (KR); Yong Jin Kim, Gwangmyeong-si (KR); Byoung Hyuk Lee, Suwon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 60 days.

(21) Appl. No.: 13/402,314

(22) Filed: Feb. 22, 2012

(65) Prior Publication Data

US 2013/0146383 A1 Jun. 13, 2013

(30) Foreign Application Priority Data

Dec. 12, 2011 (KR) .................. 10-2011-0132665

(51) Int. Cl.
*B60K 5/12* (2006.01)

(52) U.S. Cl.
USPC ........................ 180/292; 180/378; 180/312

(58) Field of Classification Search
USPC ......... 180/291, 377, 378, 381, 382, 311, 312, 180/292
See application file for complete search history.

(56) References Cited

U.S. PATENT DOCUMENTS

| 4,564,082 A * | 1/1986 | Takehara et al. ............... 180/312 |
| 4,650,030 A * | 3/1987 | Moriyama et al. ............. 180/292 |
| 4,746,145 A * | 5/1988 | Furuichi et al. ................ 280/786 |
| 5,303,798 A | 4/1994 | Nakamura et al. |
| 8,132,640 B2 * | 3/2012 | Heitkamp et al. ............. 180/379 |
| 2012/0160590 A1* | 6/2012 | Wakatsuki et al. ............ 180/291 |
| 2012/0235375 A1* | 9/2012 | Kudla et al. ............ 280/124.109 |

FOREIGN PATENT DOCUMENTS

| JP | 62-261529 A | 11/1987 |
| JP | 6-239145 A | 8/1994 |
| JP | 6-270704 A | 9/1994 |
| JP | 8-216699 A | 8/1996 |
| KR | 1998-0008994 A | 4/1998 |
| KR | 10-2009-0048094 A | 5/2009 |

* cited by examiner

*Primary Examiner* — John Walters
*Assistant Examiner* — Brian Swenson
(74) *Attorney, Agent, or Firm* — Morgan, Lewis & Bockius LLP

(57) ABSTRACT

A front differential-integrated engine support bracket, which may be mounted on an engine to connect the engine and an engine mount may include a connecting portion formed in a front thereof and connected to the engine mount, a fixing portion formed in a rear thereof and fixed to the engine, a fastening portion formed between the fixing portion and the connecting portion, wherein the engine support bracket may be fastened together with a front differential mounted on the engine by the fastening portion.

3 Claims, 9 Drawing Sheets

FRONT DIFFERENTIAL-INTEGRATED ENGINE SUPPORT BRACKET

CROSS-REFERENCE TO RELATED APPLICATION

The present application claims priority to Korean Patent Application No 10-2011-0132665 filed Dec. 12, 2011, the entire contents of which is incorporated herein for all purposes by this reference.

BACKGROUND OF THE INVENTION

1. Field of the Invention

The present invention relates to an engine support bracket connected to an engine mount of a vehicle. More particularly, it relates to an engine support bracket mounted in a four-wheel drive vehicle together with a front differential and a front differential shaft.

2. Description of Related Art

An engine mounted in a vehicle generates considerable vibrations due to periodic changes in the position of the center by the up and down movement of a piston and a connecting rod, due to inertia of reciprocating parts generated in the axial direction of a cylinder, due to periodic changes in torque applied to a crank shaft by the connecting rod, etc. In order to reduce the vibration of the engine, an engine mount system is provided in the vehicle.

Moreover, an engine support bracket for connecting a power train as a vibration source and an engine mount as a vibration insulator is provided in the engine mount system.

Meanwhile, a four-wheel drive system in a front engine rear drive (FR) vehicle is very disadvantageous in terms of layout due to various components added for the four-wheel drive. In particular, in the FR vehicle equipped with the four-wheel drive system, it is necessary to distribute the driving force to a front side so as to drive the front wheels and, to this end, a front differential and a front differential shaft are provided in the vehicle.

However, since the front differential and the front differential shaft are located in the same position as the engine mount, the front differential and the front differential shaft are mounted in the vehicle after the engine mount is moved to the left and right so as to avoid interference between the respective parts.

FIG. 1 shows a structure in which a front differential 10, a front propeller shaft 20, and an engine mount are provided together, and FIG. 2 shows a comparison between an engine support bracket in a conventional two-wheel drive system and an engine support bracket in a four-wheel drive system.

As shown in FIG. 1, the conventional problem that installation positions of the respective parts overlap each other is solved by extending the length of an engine support bracket 50 for connecting an engine 60 and an engine mount 40 and mounting the engine support bracket 50 after moving the engine mount 40, whose position can be easily adjusted, to the left and right, thereby avoiding interference between the parts.

In this regard, referring to FIG. 2, in the conventional four-wheel drive system, the engine support bracket 50 is configured to form a connecting point between the engine support bracket 50 and the engine mount while avoiding interference with the front differential 10, which results in an increase in the length of the engine support bracket 50.

Accordingly, in the case of the conventional engine mount system, the engine mount 40 extends to the left and right, and thus the length of the engine support bracket 50 increases. As a result, the dynamic stiffness of the engine support bracket 50 is reduced, which affects the transmission sound during driving at high speed.

Therefore, in a state where the length of the engine support bracket is inevitably increased to avoid the interference between the parts, an engine mount system with a new structure for improving the dynamic stiffness is required.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an engine support bracket which connects a power train and an engine mount in an engine mount system and has improved stiffness so as to isolate vibration applied to the engine support bracket, thereby improving noise, vibration and harshness (NVH) characteristics.

In an aspect of the present invention, a front differential-integrated engine support bracket, which is mounted on an engine to connect the engine and an engine mount, may include a connecting portion formed in a front thereof and connected to the engine mount, a fixing portion formed in a rear thereof and fixed to the engine, a fastening portion formed between the fixing portion and the connecting portion, wherein the engine support bracket is fastened together with a front differential mounted on the engine by the fastening portion.

The front differential and the engine support bracket are integrally fastened on the engine by the fastening portion.

The fastening portion may include a groove having an internal screw thread, and the front differential and the engine support bracket are fastened together by fastening a bolt to the fastening portion.

At least one of the fixing portions extends adjacent to the fastening portion.

The fixing portion is fixed to an engine cylinder block.

Other aspects and exemplary embodiments of the invention are discussed infra.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
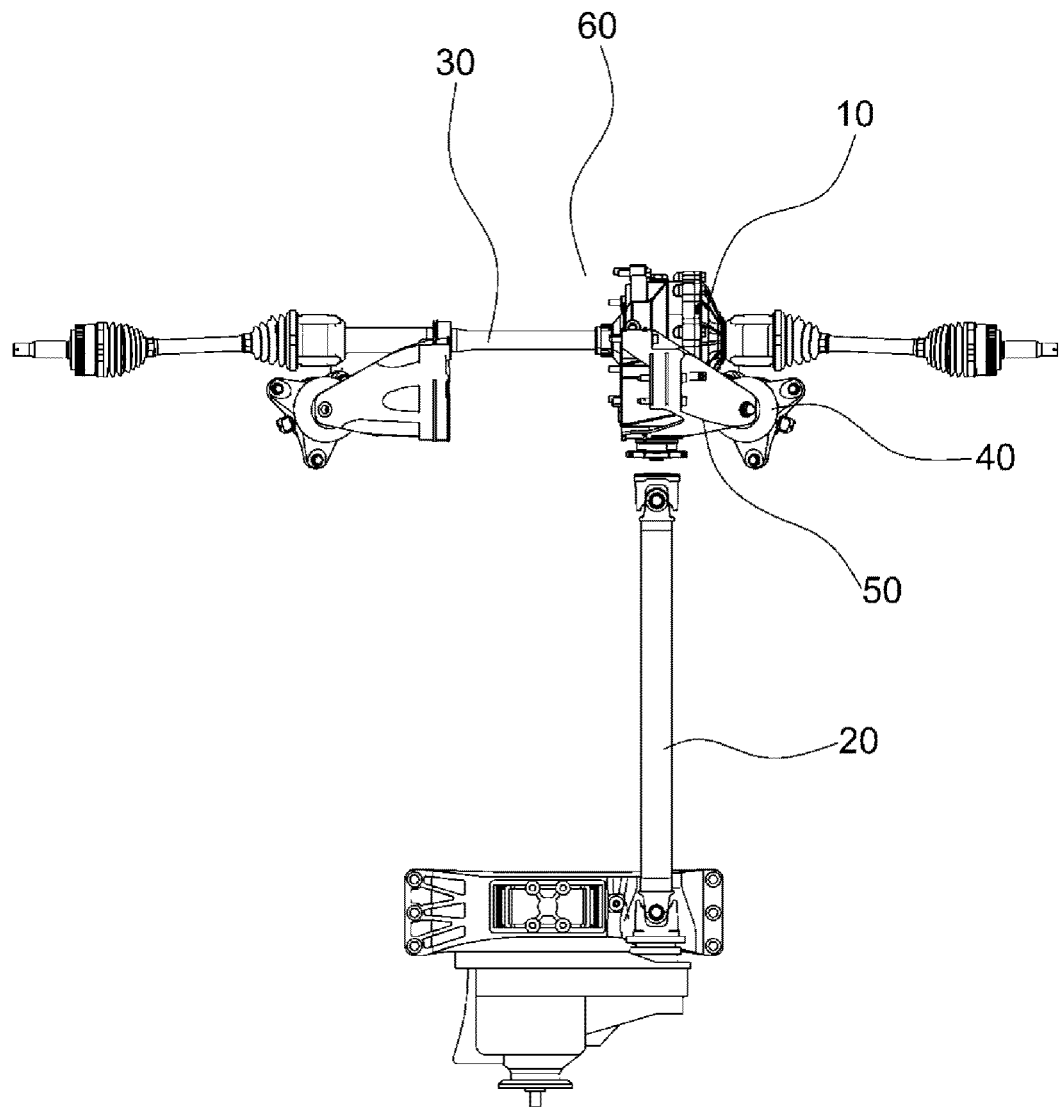
FIG. 1 shows a structure in which a conventional engine mount is provided together with a front differential.
Figure 2:
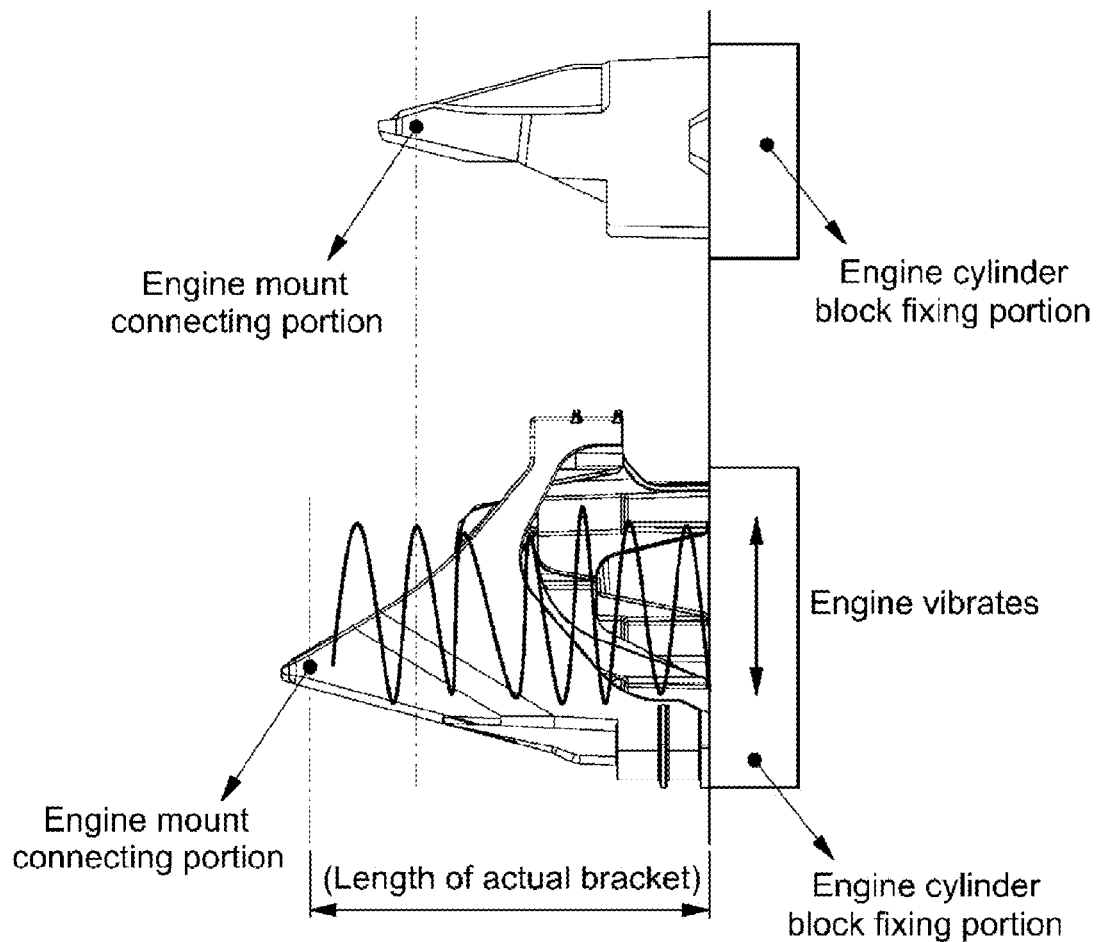
FIG. 2 shows a comparison between an engine support bracket in a conventional two-wheel drive system and an engine support bracket in a four-wheel drive system.

Reference numerals set forth in the Drawings includes reference to the following elements as further discussed below:

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The above and other features of the invention are discussed infra.

The present invention provides a front differential-integrated engine support bracket, which is configured to prevent a reduction in dynamic stiffness of the engine support bracket, to reduce vibration noise, and to avoid interference with the front differential and an engine mount, even when the front differential is provided in a four-wheel drive vehicle.

Figure 3:
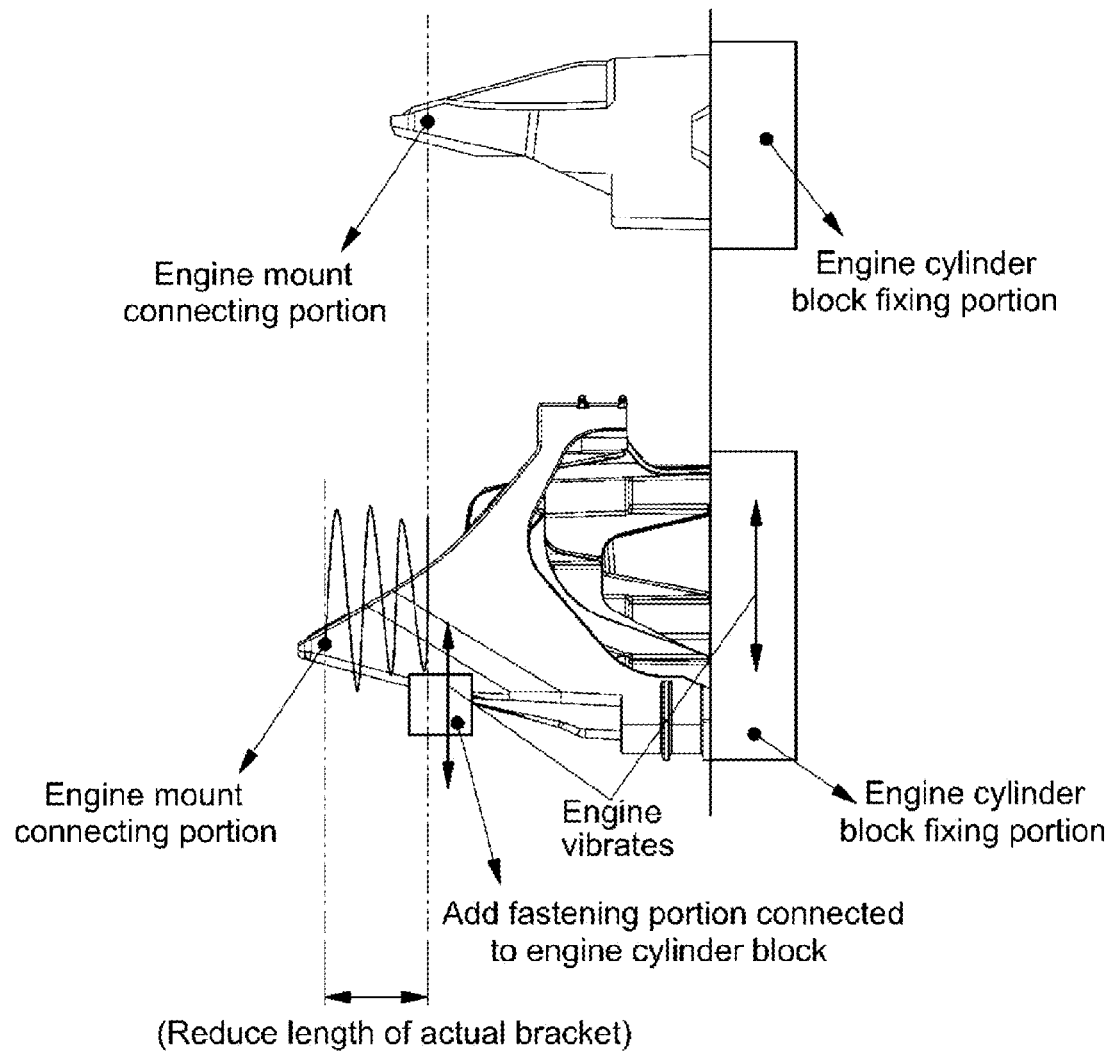
FIG. 3 shows a comparison between a conventional engine support bracket and a front differential-integrated engine support bracket in accordance with an exemplary embodiment of the present invention.

FIG. 3 shows a comparison between a conventional engine support bracket and a front differential-integrated engine support bracket in accordance with an exemplary embodiment of the present invention.

First, the upper diagram of FIG. 3 shows an engine support bracket applied to a typical two-wheel drive vehicle in which no front differential is provided.

Such an engine support bracket applied to the two-wheel drive vehicle includes a fixing portion formed at the rear of the bracket and fixed to an engine cylinder block and a connecting portion formed in front of the bracket and connected to an engine mount.

Accordingly, in the engine support bracket applied to the two-wheel drive vehicle, the engine is connected to the engine mount by means of the fixing portion and the connecting portion.

The fixing portion and connecting portion may be configured such that the engine support bracket may be mounted on the engine cylinder block and the engine mount, and various connection methods may be used. Thus, the fixing portion and connecting portion may have any appropriate shape, respectively.

Preferably, the fixing portion and connecting portion may include a groove having an internal screw thread to be bolt-connected to the engine cylinder block and the engine mount, respectively.

Meanwhile, the lower diagram of FIG. 3 shows a front differential-integrated engine support bracket in accordance with an exemplary embodiment of the present invention.

Referring to FIG. 3, the overall length of a front differential-integrated engine support bracket in accordance with an exemplary embodiment of the present invention increases to avoid interference with the front differential provided to implement a four-wheel drive vehicle.

That is, as shown in FIG. 3, in the front differential-integrated engine support bracket in accordance with an exemplary embodiment of the present invention, the connecting portion connected to the engine mount is configured to be spaced further away from the fixing portion fixed to the engine cylinder block, compared to the two-wheel drive vehicle, and thus the length of the bracket with respect to dynamic stiffness further increases.

Meanwhile, in an exemplary embodiment of the present invention, in order to prevent the reduction in dynamic stiffness as the length of the bracket increases, a fastening portion fastened to the front differential is further formed between the fixing portion fixed to the engine cylinder block and the connecting portion connected to the engine mount.

Here, the fastening portion may include a groove having an internal screw thread and the front differential may include a groove 140 corresponding to the fastening portion such that the engine support bracket may be fixed to the front differential by fastening a bolt 150 to the grooves 140.

Preferably, in an exemplary embodiment of the present invention, the engine support bracket and the front differential may be configured to be integrally mounted on the engine by means of the fastening portion. In this regard, the engine support bracket and the front differential may be integrally fastened together by means of the groove on the front differential connected to the fastening portion and then directly mounted on the engine by means of the fastening portion.

Thus, in the front differential-integrated engine support bracket in accordance with an exemplary embodiment of the present invention, a new fixing point mounted on the engine is formed on the engine by means of the fastening portion, and thus the length of the bracket with respect to the dynamic stiffness can be reduced.

That is, in an exemplary embodiment of the present invention, the length of the bracket with respect to the dynamic stiffness substantially means the interval between the connecting portion connected to the engine mount and the fixing portion fixed to the engine cylinder block. Accordingly, it is possible to substantially reduce the mounting distance between the engine and the engine mount by further providing the fixing point in the interval.

Figure 4:
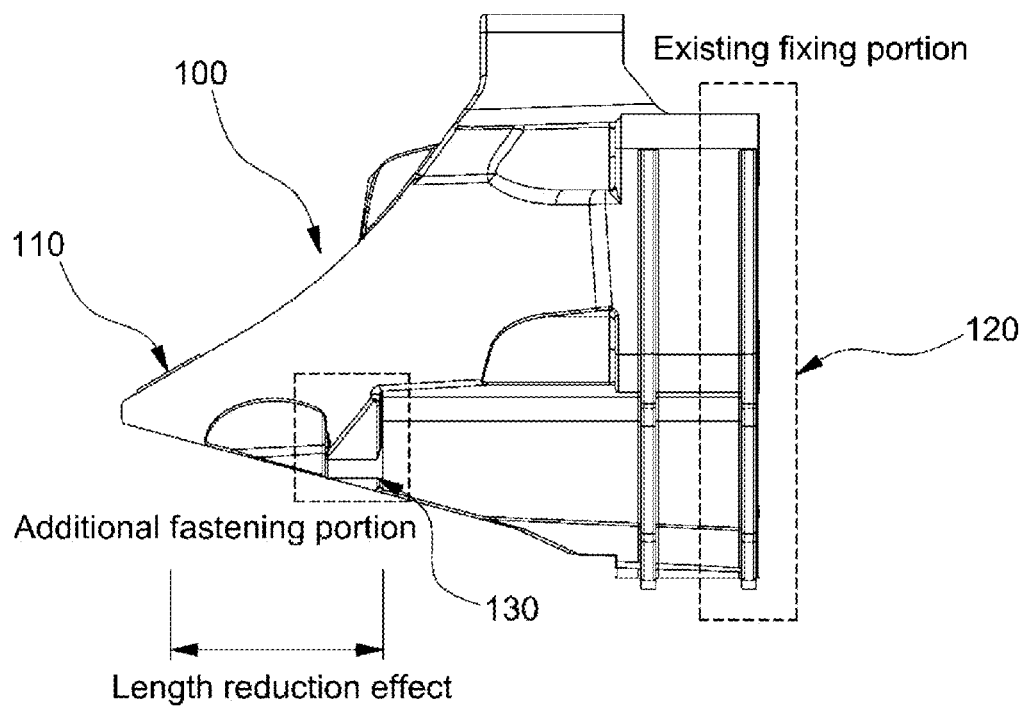
FIG. 4 shows a front differential-integrated engine support bracket in accordance with an exemplary embodiment of the present invention.

This effect is shown in FIG. 4, in which one fastening portion is added to the interval between the connecting portion connected to the engine mount and the fixing portion fixed to the engine cylinder block, thereby substantially reducing the length of the bracket.

Figure 5:
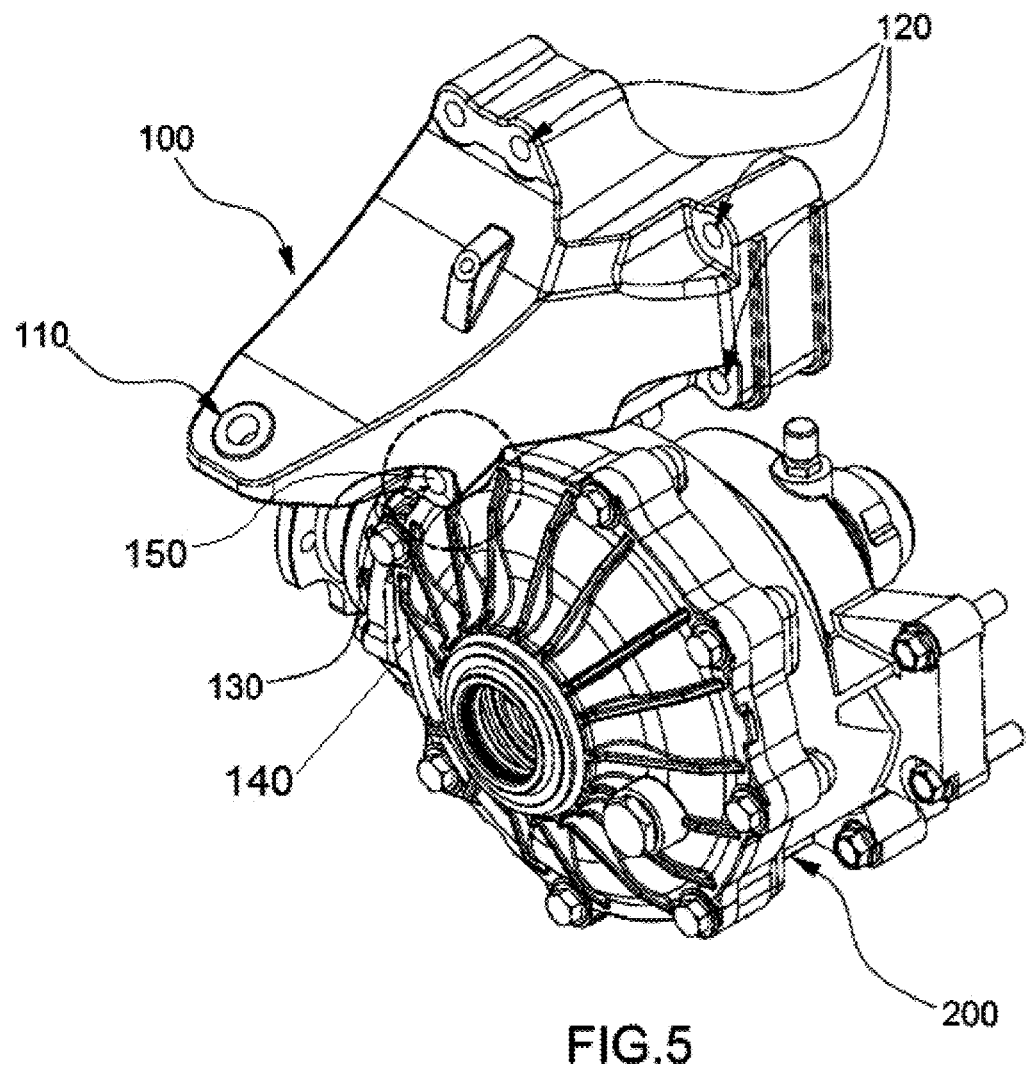
FIG. 5 is a perspective view showing that the front differential-integrated engine support bracket of FIG. 4 is provided together with a front differential.

In this regard, an example in which the front differential-integrated engine support bracket of FIG. 4 is integrally fastened to the front differential by means of the fastening portion is shown in FIG. 5.

Referring to FIG. 5, a front differential and a front differential-integrated engine support bracket 100 are mounted on the engine cylinder block by means of a fixing portion 120 at the rear, respectively, and the front differential-integrated engine support bracket 100 is connected to the engine mount by means of a connecting portion 110 in front thereof.

Moreover, the front differential-integrated engine support bracket 100 is fastened to the front differential 200 by means of a fastening portion 130 formed between the connecting portion 110 connected to the engine mount and the fixing portion 120 fixed to the engine cylinder block.

Here, since the front differential 200 is mounted on the engine, the front differential-integrated engine support bracket 100 forms a new fixing point mounted on the engine.

As a result, the front differential-integrated engine support bracket 100 may be mounted on the engine by means of the fastening portion 130, and thus the length of the bracket can be substantially reduced.

Figure 6:
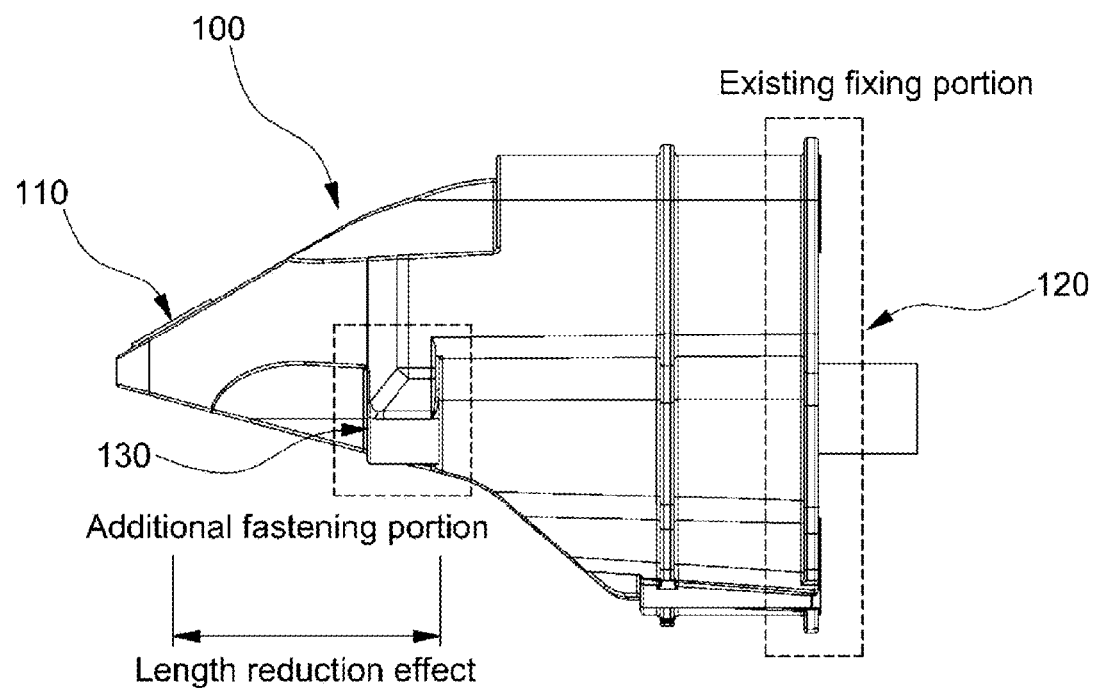
FIG. 6 is a side view showing a front differential-integrated engine support bracket in accordance with another exemplary embodiment of the present invention.
Figure 7:
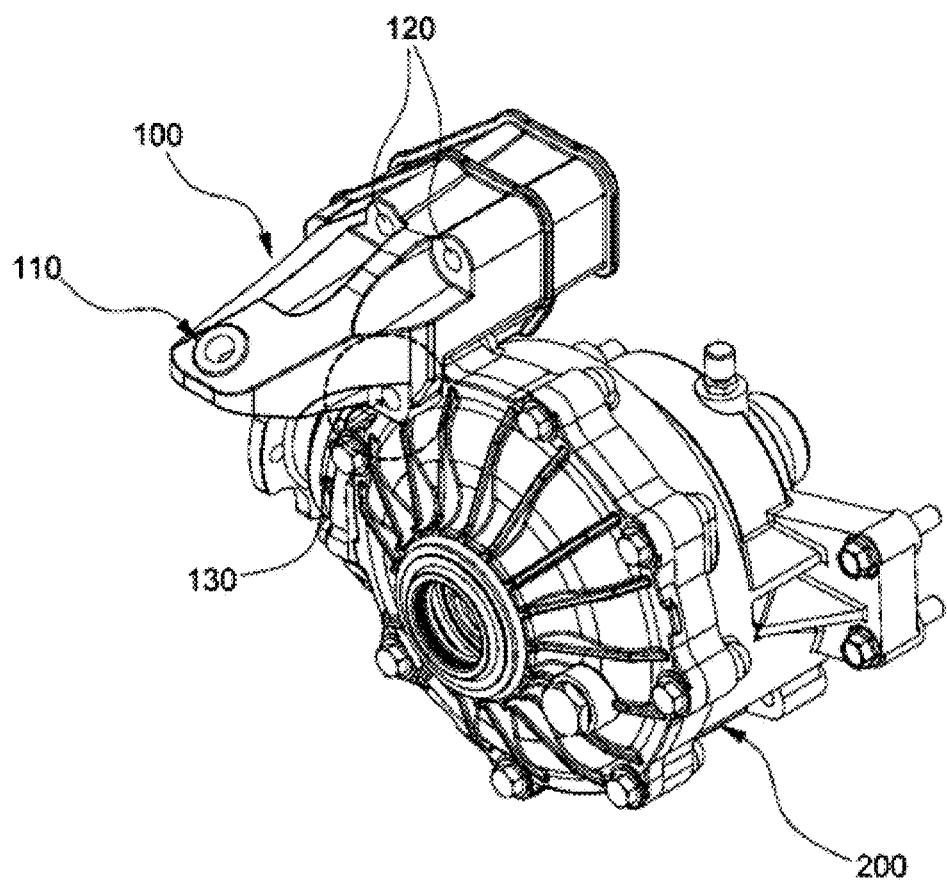
FIG. 7 is a perspective view showing that the front differential-integrated engine support bracket of FIG. 6 is provided together with a front differential.

Meanwhile, FIGS. 6 and 7 show a front differential-integrated engine support bracket 100 in accordance with another exemplary embodiment of the present invention. In FIGS. 6 and 7, an example in which the shape of the engine support bracket 100 is modified in terms of the shape of an engine and the layout between components in an engine room is shown.

That is, as can be seen from the examples of FIGS. 6 and 7, in the front differential-integrated engine support bracket 100 in accordance with another exemplary embodiment of the present invention, a fastening portion 130 to be fastened to a front differential 200 may be formed on the engine support bracket 100 in a region between a fixing point fixed to the engine and a connecting point connected to the engine mount, and thus the shape of the engine support bracket 100 may be appropriately modified.

Accordingly, the front differential-integrated engine support bracket 100 in accordance with another exemplary embodiment of the present invention may be applied to the vehicles regardless of the model of the vehicle and the type of the engine.

In an exemplary embodiment of the present invention, at least one of the fixing portion 120 may extend near to the additional fastening portion 130, thereby increasing dynamic stiffness of the engine support bracket 100.

Figure 8:
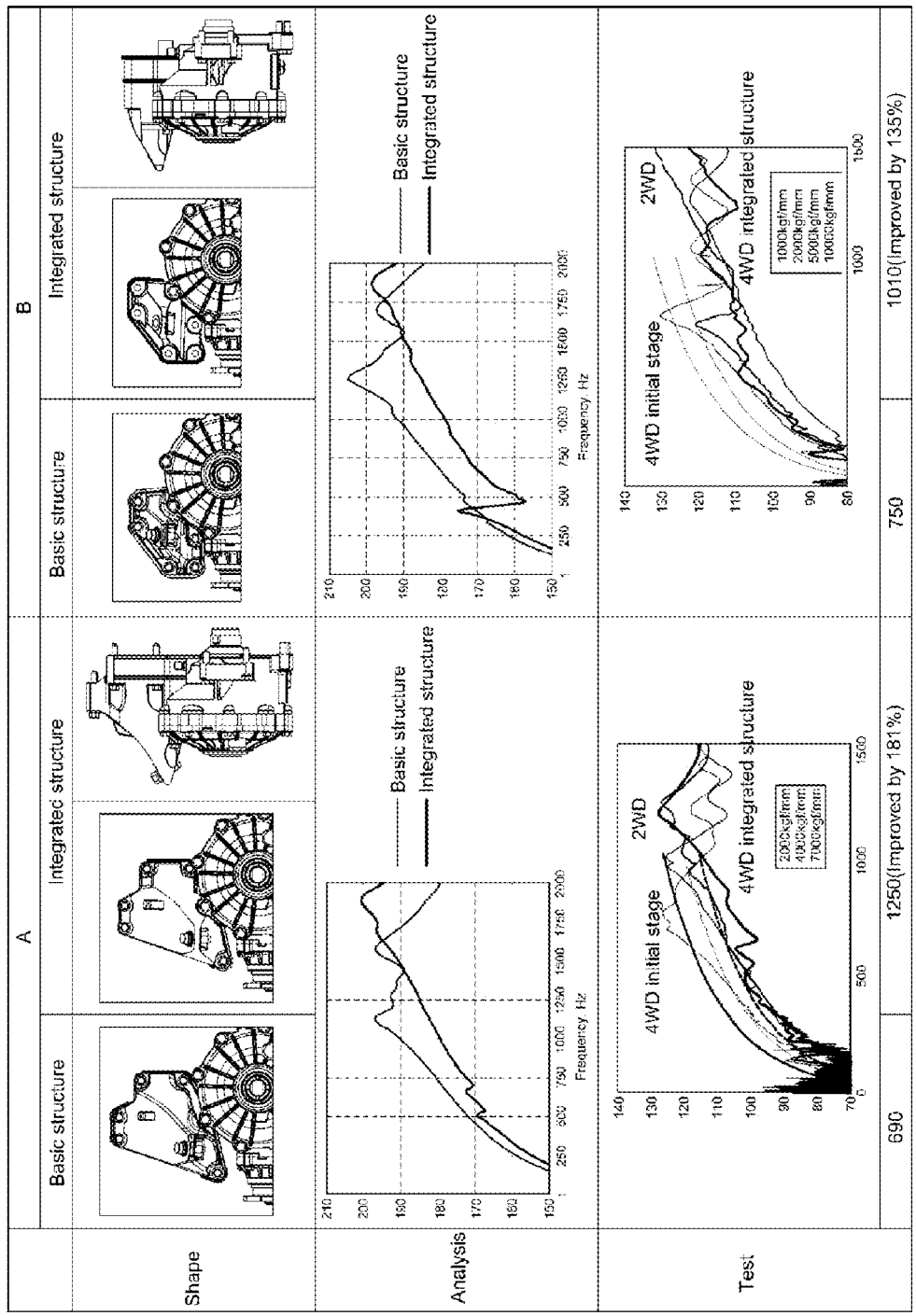
FIG. 8 shows the difference in vibration reduction between the front differential-integrated engine support bracket in accordance with the present invention and a conventional engine support bracket.

FIG. 8 shows the difference in vibration reduction between the front differential-integrated engine support bracket in accordance with the present invention and a conventional engine support bracket.

In FIG. 8, the "basic structure" represents the conventional structure in which the front differential and the engine mount are not fastened together, and the "integrated structure" represents the structure in which the front differential and the engine support bracket are integrally fastened by means of the fastening portion.

Moreover, the two data were obtained based on engine support brackets having different shapes and mounted in different types of engines.

Referring to the graphs at the bottom of FIG. 8 with regard to the test results, it can be seen that the integrated structure according to an exemplary embodiment of the present invention exhibits a smaller acceleration value than that of the basic structure at 200 to 1,000 Hz, which is a main area of interest with respect to the vibration of an actual vehicle, and exhibits improved vibration performance.

Figure 9:
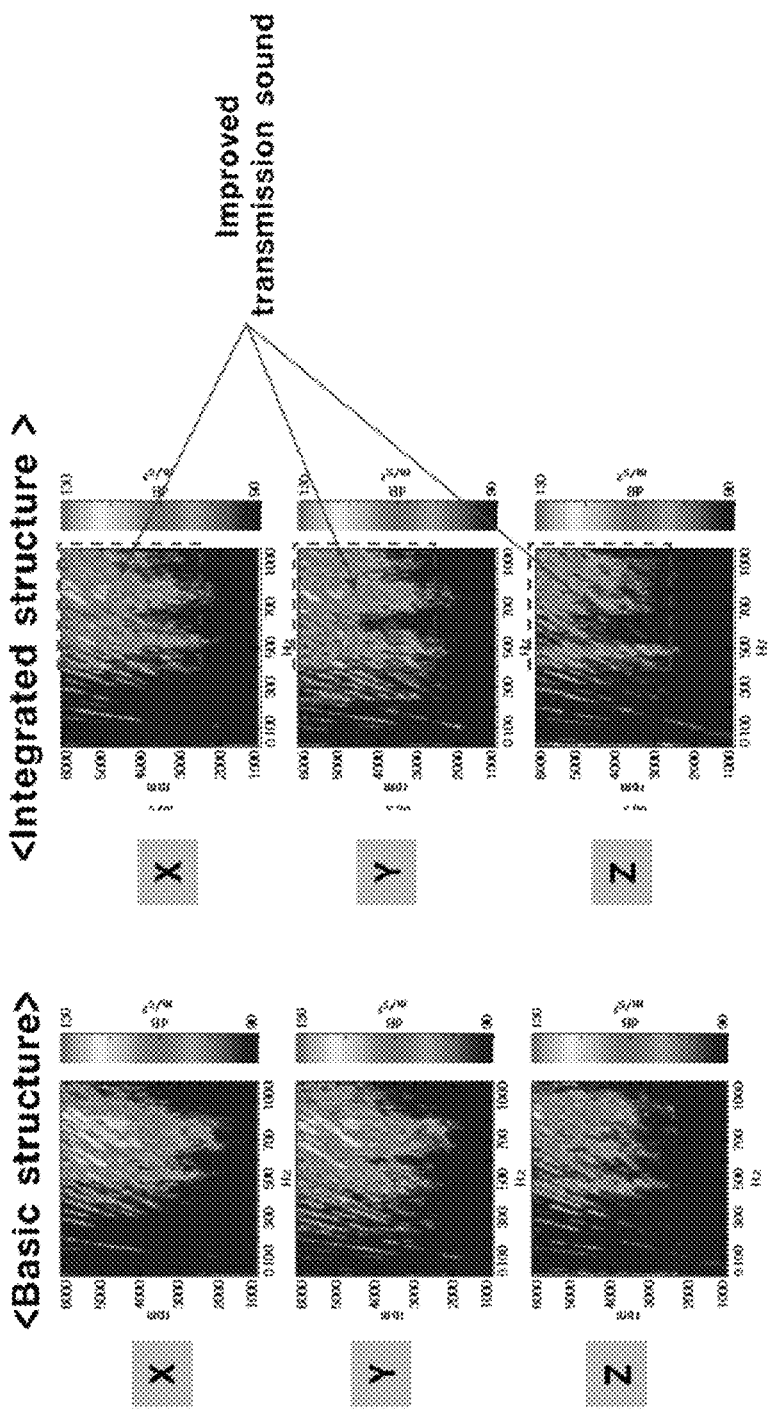
FIG. 9 shows the difference in transmission sound reduction between the front differential-integrated engine support bracket in accordance with the present invention and a conventional engine support bracket.

Meanwhile, FIG. 9 shows the difference in transmission sound reduction between the front differential-integrated engine support bracket in accordance with the present invention and a conventional engine support bracket.

Referring to FIG. 9, it can be seen that transmission sound characteristics in all X, Y and Z directions are improved in the integrated structure, compared to the basic structure.

Therefore, referring to FIGS. 8 and 9, while the resonant frequency of the engine support bracket of the basic structure is about 690 Hz and 750 Hz, the resonant frequency of the engine support bracket of the integrated structure is increased to 1,250 Hz and 1,010 Hz, respectively, and thus the vibration sensitivity at 600 to 900 Hz is improved by about 20 dB.

As described above, in the front differential-integrated engine support bracket, the front differential and the engine support bracket are fastened together, which substantially reduces the length of the engine support bracket, thereby improving the dynamic stiffness of the engine support bracket.

As a result, the resonant frequency of the engine support bracket increases to improve the vibration sensitivity at 600 to 900 Hz, which is related to the indoor noise during driving, thereby reducing the noise.

For convenience in explanation and accurate definition in the appended claims, the terms "front" and "rear" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A front differential-integrated engine support bracket, which is mounted on an engine to connect the engine and an engine mount, the front differential-integrated engine support bracket comprising:

a connecting portion formed in a front thereof and connected to the engine mount;

a fixing portion formed in a rear thereof and fixed to the engine;

a fastening portion formed between the fixing portion and the connecting portion;

wherein the engine support bracket is fastened together with a front differential mounted on the engine by the fastening portion to substantially reduce a mounting distance between the engine and the engine mount by further providing an additional fixing point between the connecting portion and the fixing portion;

wherein the front differential and the engine support bracket are integrally fastened on the engine by the fastening portion; and wherein the fastening portion includes a groove having an internal screw thread, and the front differential and the engine support bracket are fastened together by fastening a bolt to the fastening portion.

2. The engine support bracket of claim 1, wherein at least one of the fixing portions extends adjacent to the fastening portion.

3. The engine support bracket of claim 1, wherein the fixing portion is fixed to an engine cylinder block.

* * * * *